United States Patent
Dice et al.

(10) Patent No.: US 9,021,502 B2
(45) Date of Patent: Apr. 28, 2015

(54) METHOD AND SYSTEM FOR INTER-THREAD COMMUNICATION USING PROCESSOR MESSAGING

(75) Inventors: David Dice, Foxboro, MA (US); Mark S. Moir, Windham, NH (US)

(73) Assignee: Oracle America Inc., Redwood City, CA (US)

(*) Notice: Subject to any disclaimer, the term of this patent is extended or adjusted under 35 U.S.C. 154(b) by 1158 days.

(21) Appl. No.: 12/345,179

(22) Filed: Dec. 29, 2008

(65) Prior Publication Data

US 2010/0169895 A1    Jul. 1, 2010

(51) Int. Cl.
G06F 3/00 (2006.01)
G06F 9/46 (2006.01)
G06F 9/54 (2006.01)
G06F 9/30 (2006.01)

(52) U.S. Cl.
CPC .............. *G06F 9/466* (2013.01); *G06F 9/544* (2013.01); *G06F 9/3009* (2013.01)

(58) Field of Classification Search
None
See application file for complete search history.

(56) References Cited

U.S. PATENT DOCUMENTS

| | | | |
|---|---|---|---|
| 5,247,684 A * | 9/1993 | Tavares et al. ........................ 1/1 |
| 5,297,269 A | 3/1994 | Donaldson et al. |
| 5,303,362 A | 4/1994 | Butts, Jr. et al. |
| 5,428,761 A | 6/1995 | Herlihy et al. |
| 5,579,504 A * | 11/1996 | Callander et al. ............. 711/144 |
| 6,360,231 B1 | 3/2002 | Pong et al. |
| 6,735,760 B1 | 5/2004 | Dice |
| 7,877,549 B1 * | 1/2011 | Panwar et al. ................. 711/141 |
| 2003/0210655 A1 * | 11/2003 | Glasco .......................... 370/244 |
| 2007/0198979 A1 * | 8/2007 | Dice et al. ..................... 718/100 |
| 2008/0177955 A1 * | 7/2008 | Su ................................. 711/154 |
| 2008/0183979 A1 * | 7/2008 | Larson et al. ................. 711/154 |
| 2010/0031265 A1 * | 2/2010 | Koning et al. ................. 718/104 |

OTHER PUBLICATIONS

Dave Dice, "Implementing Fast Java Monitors with Relaxed-Locks," USENIX JVM'01, http://www.usenix.org/events/jvm01/full_papers/dice/dice.pdf, Date: Apr. 24, 2001.

(Continued)

*Primary Examiner* — Andy Ho
*Assistant Examiner* — Carina Yun
(74) *Attorney, Agent, or Firm* — Robert C. Kowert; Meyertons, Hood, Kivlin, Kowert & Goetzel, P.C.

(57) ABSTRACT

In shared-memory computer systems, threads may communicate with one another using shared memory. A receiving thread may poll a message target location repeatedly to detect the delivery of a message. Such polling may cause excessive cache coherency traffic and/or congestion on various system buses and/or other interconnects. A method for inter-processor communication may reduce such bus traffic by reducing the number of reads performed and/or the number of cache coherency messages necessary to pass messages. The method may include a thread reading the value of a message target location once, and determining that this value has been modified by detecting inter-processor messages, such as cache coherence messages, indicative of such modification. In systems that support transactional memory, a thread may use transactional memory primitives to detect the cache coherence messages. This may be done by starting a transaction, reading the target memory location, and spinning until the transaction is aborted.

16 Claims, 6 Drawing Sheets

(56) References Cited

OTHER PUBLICATIONS

"MESI protocol", Wikipedia.org, http://en.wikipedia.org/wiki/MESI_protocol, last modified Jan. 26, 2009.

J. Mellor-Crummey and M. Scott, "Algorithms for scalable synchronization on shared-memory multiprocessors," ACM Transactions on Computer Systems, 9(1), 1991.

* cited by examiner

METHOD AND SYSTEM FOR INTER-THREAD COMMUNICATION USING PROCESSOR MESSAGING

BACKGROUND OF THE INVENTION

1. Field of the Invention

This invention relates generally to multithreaded computer systems, and more specifically to a system and method for programmatic communication among threads of a multi-threaded system using inter-processor messages.

2. Description of the Related Art

Due to the complexity and energy concerns of modern processors, traditional approaches to boosting CPU performance have become difficult and ineffective. Instead of attempting to drive up clock speeds, computer architects are increasingly turning to multi-threading techniques such as symmetric multi-threading or multi-core architectures. In order to leverage these new architectures, software engineers must write applications that execute using multiple concurrent threads of execution.

Shared-memory systems may allow multiple threads of execution to access and operate on the same memory locations. Threads often employ shared memory for inter-thread communication. For instance, a given thread T1 may repeatedly poll a shared memory location A, for a message from another thread T2. At some point, T2 may write a value into memory location A. Subsequent to this write, T1 may read the value and respond according to its program logic.

In the above example, while T1 awaits the message from T2 to arrive in shared memory location A, TI may be said to be "spinning on A." Spinning on a memory location (i.e., a variable) is a common way for threads in a shared memory system to communicate. However, communication via shared memory in this traditional manner may be wasteful of system resources, such as system buses.

SUMMARY

Using traditional shared memory communication, a receiving thread may read a value from memory, a sending thread may then modify it, and the receiving thread may then detect the change by reading the new value. The receiving thread must therefore read the value of the shared memory location at least twice in order to detect that it has been modified. According to various cache coherence protocols used in multi-processor systems, this may cause the processor executing the receiving thread to broadcast at least two messages on a system bus, thereby consuming bus bandwidth. A receiving thread may also "spin" on the shared memory location by repeatedly polling it until its value has changed.

In various embodiments, rather than reading a shared memory location a second time, a receiving thread may determine that the value of the shared memory location has changed by receiving an indication from a remote processor, such as one or more cache coherence messages. Thus, the processor executing the receiving thread may not be required to broadcast superfluous cache coherence messages across the bus.

In various embodiments, a thread, executing on a given processor, may read a shared memory location and enter an infinite or effectively infinite loop. Such a loop may comprise a set of program instructions that define a loop body and zero or more terminating conditions. The term infinite loop, as used herein, may refer to a loop that defines no terminating conditions or that defines terminating conditions that cannot be satisfied during loop execution. The infinite loop may be effectively or strictly infinite and the loop body may be empty or contain one or more instructions, in different embodiments. For example, instructions included in the loop may be executable by the receiving thread to yield the processor to other threads while the receiving thread waits. While the receiving thread spins in the infinite loop, a sending thread, executing on another processor, may modify the value contained in the shared memory location by executing a store instruction. As a result, the receiving thread may receive an indication from the other processor that the value of the shared memory location has been modified and, in response, the receiving thread may terminate the infinite loop. In some embodiments, the indication may be one or more cache coherence messages and/or may be routed through the processor executing the receiving thread. The receiving thread may then execute program logic associated with receiving a message from the sender.

In various embodiments, a receiving thread may use transactional memory to programmatically detect one or more cache coherence messages indicating that a shared memory location has been modified. For example, in one embodiment, a thread executing on a given processor may begin a transaction, read a value from shared memory, and enter an infinite loop that does not commit the transaction. While the receiving thread spins in the infinite loop, a sending thread may modify the value contained in the shared memory location by executing a store instruction. As a result, the receiving thread may receive one or more cache coherence messages indicating that the value of the shared memory location has been modified and, in response, the receiving thread may abort the transaction. The transaction abort may effectively terminate the infinite loop. In some embodiments, the receiving thread may then execute program logic associated with receiving a message from the sender.

In various embodiments, the indication may not include the new value of the shared memory location. The new value of the shared memory location may be different from the old value. In some embodiments, the receiving thread may retry the transaction subsequent to the abort. In other embodiments, the receiving thread may execute other instructions in response to receiving an indication that the value of a shared memory location has been modified.

In some embodiments, a thread may spin on a lock by using the disclosed technique. For example, the shared memory location may represent a lock and the value of that location may represent the value of the lock. A receiving thread may read the value of the held lock and spin until receiving an indication from another processor that the lock value has been modified. The receiving thread may interpret this modification as indicative of the lock being released, and the receiving thread may therefore attempt to acquire the lock. In some embodiments, spinning on a lock may be performed using transactional memory and cache coherence messages as described above.

Figure 1:
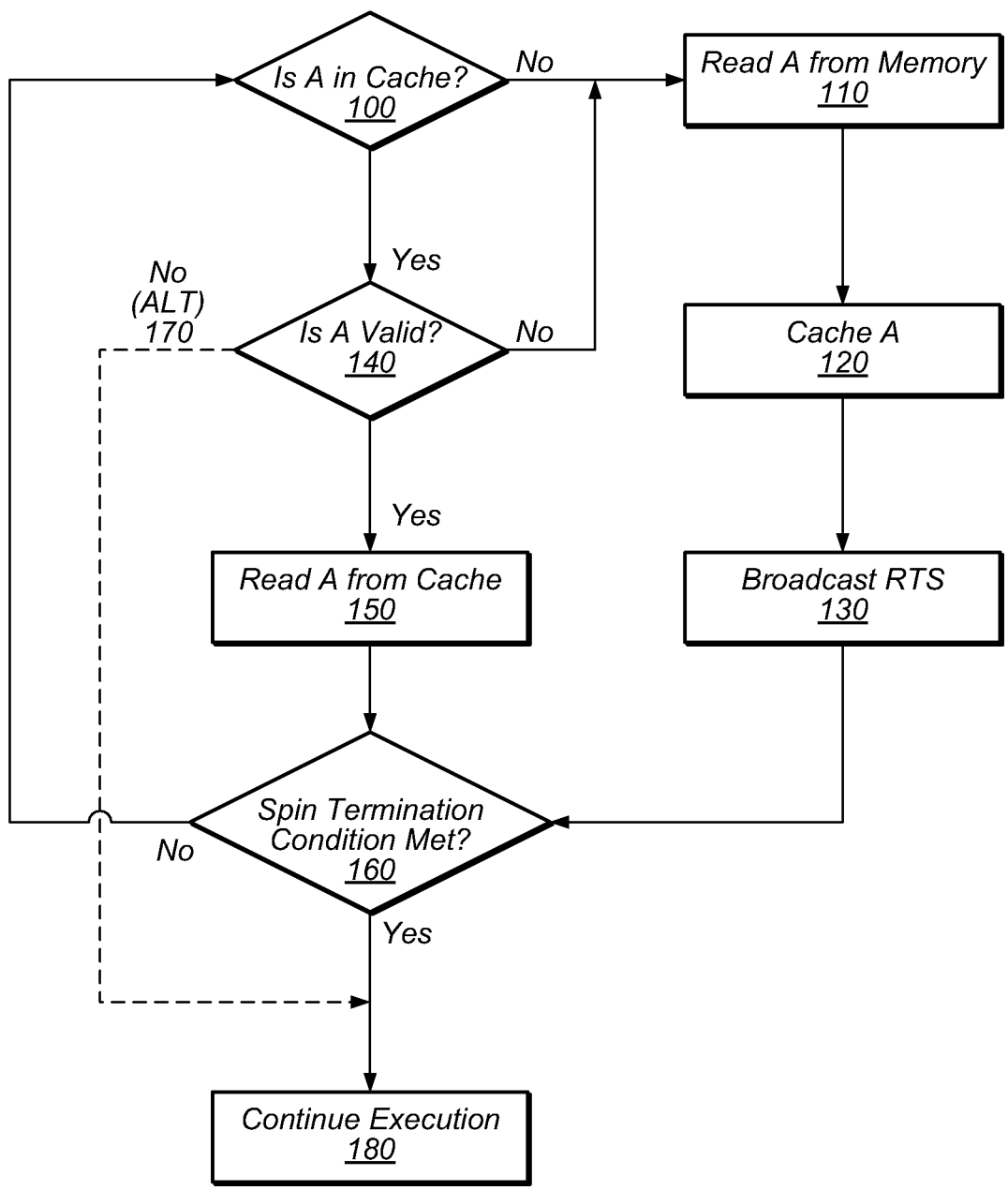
FIG. 1 is a flowchart illustrating a method for spinning on a variable, according to some embodiments.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF THE EMBODIMENTS

In shared memory systems, threads may communicate via shared memory. For example, one thread may communicate with another by modifying a given shared memory location, such as a shared variable. When the second thread detects the change in the memory location's value, it may respond by executing appropriate program logic.

While inter-thread communication via shared memory is often useful, traditional techniques may be wasteful of system resources, such as communication bus bandwidth. This is because, in traditional techniques, the reading thread must repeatedly read the value of a shared memory location in order to observe that the value has changed. In some cases, the message that is communicated between threads is dependent on the new value of a shared location. In other words, the value written by one thread may affect the behavior of the reading thread. In other cases, however, a message receiver may only be concerned with whether or not the value of a shared memory location has changed and not necessarily with the new value itself. Such scenarios are common in shared memory programs. For example, a reading thread may simply execute a while loop with an empty body, in anticipation of a new value being written to a memory location A. This may be referred to as "spinning on A". An example of spinning on a variable is demonstrated by the following pseudo-code:

while ($A$==1){ }

In this example, a thread T1 executing this code does not advance (i.e., it spins) so long as the value of A equals 1. When the value of A is not 1, then T1 may continue to execute the rest of its program logic. In this scenario, the control flow of T1 is contingent on a change event (e.g., A has been modified) and not on the results of the change event (e.g., the new value of A is 3). Such scenarios commonly arise in shared memory, multi-threaded programming. For example, A may be the location of a one-word lock over a critical section. While some thread T2 holds the lock, the value of A may be 1. In order to acquire the lock, the executing thread T1 may spin on A, e.g., using code similar to the pseudo-code above. When T2 exits its critical section, T2 may modify A to some other value (e.g., 0), thereby signaling that T2 has released the lock. At that point, T1 may stop spinning and attempt to acquire the lock by changing the value of A back to 1, perhaps by using an atomic compare-and-swap instruction. In this example, T1 is concerned only with whether the value of A has been modified, and not necessarily with the new value of A.

In some embodiments, rather than being empty, the loop body may include any number and/or combination of instructions and may even provide execution paths that lead out of the loop. For example, the loop may be configured to terminate after a certain amount of time and/or a given number of iterations. A loop body may also contain instructions executable to allow the thread to voluntarily yield the processor to other waiting threads. By voluntarily yielding the processor to other threads, a thread may allow the system to perform useful work while it waits for a message to arrive. In embodiments that allow multiple logical processors to exist on a single physical processor (e.g., simultaneous multi-threading systems), the loop body of a thread may contain instructions configured to cause the processor to execute from the thread's instruction stream less frequently. For example, in some embodiments, the loop body may include a "pause" instruction. In such embodiments, execution of the pause instruction within the loop body may allow threads executing on other logical processors to make more progress while the looping thread waits. In some embodiments, the loop body may contain instructions configured to cause the thread to voluntarily decrease its scheduling priority. For example, the loop may contain instructions by which a thread on a UNIX-type system may increase its "nice" value. In addition to potentially increasing system performance, the spinning techniques described above may in some embodiments lower the energy consumption of a system while a thread spins.

In some embodiments, threads may communicate through shared variables in a manner similar to that described above within constructs that do not include spinning. For example, a program may read the value of a memory location A, execute a given sequence of instructions, and read the value of A again. The program may then execute a second sequence of instructions only if the value of A has changed between the two reads.

In some cases, traditional techniques for inter-thread communication may be wasteful of system resources and/or may require more memory bus operations and/or bandwidth than may be strictly necessary. In various embodiments, a thread may observe that the value of a shared memory location has changed, without having to read the new value of the shared variable, by observing inter-processor messages, such as cache coherence messages. By doing so, a thread may reduce the number of messages sent across one or more system buses and thus make more efficient use of system resources.

Cache coherence messages may include various messages sent among processors to maintain cache coherency in some multi-processor systems. Because shared-memory systems may allow multiple threads to access and/or modify the same memory locations, care must be taken so that the values of locally cached copies of shared data remain consistent on various processors. If two threads access their respective local caches and read different values for the same shared memory location, then incorrect program execution may result.

To maintain consistency between shared memory values read by each thread from its local caches, processors may coordinate using a cache coherency protocol. Several such protocols exist, such as the MESI (i.e., Illinois protocol) and MOESI protocols. Cache coherence protocols may define a set of messages and rules by which processors may inform one another of modifications to shared data and maintain cache coherence. For example, according to the MESI protocol, each block stored in a cache must be marked as being in one of four states: modified, exclusive, shared, or invalid. The protocol defines a set of messages and rules for sending and interpreting those messages, by which processors maintain the proper markings on each block. Depending on the state of a given cache block, a processor may be restricted from performing certain operations. For example, a processor may not execute program instructions that depend on a cache block that is marked as invalid. Cache coherence mechanisms may be implemented in hardware, software, or in a combination thereof, in different embodiments. Cache coherence messages may be broadcast or point-to-point. Cache coherence messages may be communicated using a system bus and/or another hardware medium.

Sending cache coherence messages may require time and/or system resources, such as bus bandwidth. In some situations, traditional techniques for communication using shared memory locations may cause superfluous messages to be sent. For example, consider a MESI protocol in the example above where T1 spins on the variable A. FIG. 1 illustrates an example workflow for T1 spinning on A under MESI or a similar protocol. During its first spin iteration, T1 may determine whether the value of A (the spin variable) is in local cache, as in 100. If the value of A is not in local cache memory, as indicated by the negative exit from 100, then T1 may fetch the value of A from main memory, as in 110, and cache the value, as in 120. Because T1 stores the value of A in cache memory, as in 120, the MESI protocol dictates that it must broadcast a read-to-share (RTS) message on a system bus, as in 130. This broadcast may consume one or more bus cycles. Having read the value of A, T1 may then determine if the spin termination condition is met, as in 160. If not, then T1 returns for a second iteration of the workflow, as indicated by the negative exit from 160 to 100.

During subsequent iterations, the value of A may remain in cache, indicated by the affirmative exit from 100. If the value is valid, as indicated by the affirmative exit from 140, then the value of A may be read from cache (as in 150) and the termination condition checked again (as in 160). In some embodiments, the termination condition may not be met until a remote thread modifies the value of A. When a remote thread modifies the value of A, the MESI protocol dictates that the remote thread must broadcast an invalidate message on the system bus, which invalidates T1's local copy of A. On the next iteration following receipt of the invalidate message, T1 may then proceed along the negative exit from 140, again reading the value of A from memory (as in 110), caching the value locally (as in 120), and broadcasting a RTS message (as in 130). In this example, broadcasting the message again consumes one or more bus cycles. If the spin termination condition is then met (as in the affirmative exit from 160), then T1 may drop out of the loop body and continue normal execution, as in 180. Otherwise, the spin may continue as indicated by the feedback from the negative exit of 160 to 100.

The traditional workflow described above may require two RTS broadcasts: a first in order to read the old value of A and a second in order to read the new value of A. However, the program logic of T1 may not depend on the new value of A, but rather only on the fact that it is different from the old value. If the program logic of T1 is not dependent on the new value of A, as is the case with the pseudo-code above, then if the protocol and/or program semantics ensure that an invalidate message is only received when the value of A has changed to a new value, then the second RTS issued by T1 may be superfluous. In some embodiments, the one or more bus cycles used to broadcast the second RTS message may be obviated in such cases.

In some embodiments, the invalidate message received by the processor executing T1 may be sufficient for communicating that the value of A has changed. In various embodiments, T1 may circumvent a second RTS broadcast and consequent consumption of one or more bus cycles in 130, by proceeding along alternative negative exit 170 from 140 to 180, if certain conditions are met. For example, in one embodiment, T1 may proceed along negative exit 170 only after the first spin iteration, that is, only if T1 has read a valid value for A in the past, either from memory (e.g., 110) or from cache (e.g., 150). This may be true if T1 is configured to drop out of the spin once A changes, and the MESI protocol ensures that an invalidate message is only received when the value of A has changed to a new value.

Figure 2:
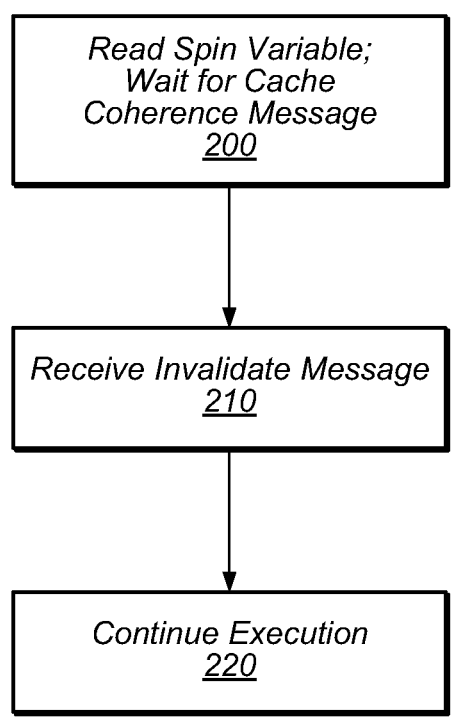
FIG. 2 is a flowchart illustrating a method for spinning on a variable, according to some embodiments.

More generally, spinning on a variable may be implemented using a workflow such as that illustrated in FIG. 2. In this example, a thread may read a spin variable and await a cache coherence message (as in 200). In response to receiving a cache coherence message (as in 210), the thread may conclude that the spin condition is met and continue execution (as in 220). In various embodiments, the coherence message may be a message that indicates that the value of the spin variable has been modified, such as an invalidate message. In various embodiments, messages from any cache coherence protocol (e.g., MESI, MOESI, etc.) may be used to determine that the value of a spin variable has changed. In other embodiments, the cache coherence protocol may send invalidate messages even when a thread overwrites a shared memory value with the same value. In such embodiments, a cache coherence message may still be used to terminate spinning on a variable if program semantics and/or other constraints dictate that the spin variable cannot be overwritten by an identical value in the given spin instance (e.g., when spinning on lock words). In some embodiments, the executing thread may check the state of a cache block containing the spin variable, as part of the spin iteration, as in FIG. 1. In other embodiments, cache coherence messages may be delivered asynchronously as interrupts uncoordinated with the executing thread's program logic.

In various embodiments, a programmer may identify constructs in a program that may benefit from communication via cache coherence protocols and insert program logic into the program to execute the disclosed communication technique. In other embodiments, a compiler application may identify such opportunities automatically and insert supporting program logic. In yet other embodiments, a combination of human intervention and compiler techniques may be used to implement the disclosed communication technique. For example, a programmer may use compiler hints to identify opportunities for communication via cache coherency messages and the compiler may then insert logic into executable code to implement the communication technique. Other cooperative methods may be possible in other embodiments.

In various embodiments, a thread may use transactional memory mechanisms to programmatically observe cache coherence traffic. Transactional memory is a mechanism that may allow a thread to execute a block of instructions as a transaction, that is, either completely and atomically or not at all. In a successful transaction, the instructions may be executed locally and then "committed", thereby allowing the aggregate effect to be seen by all other threads. Alternatively, a transaction may be "aborted" partway into execution, in which case it is not committed and no repercussions of the partial execution may be seen outside of the processor and its private structures. A transaction may be aborted for many reasons. For example, if a remote thread modifies a shared memory location that was read by an active (i.e., as yet uncommitted) transaction, then that transaction may abort.

Transactional memory mechanisms may be implemented in hardware, in software, or using a combination thereof, in different embodiments. Transactional memory implementations may, in some embodiments, provide a "checkpoint", or similar instruction, by which a thread may explicitly begin a transaction. A transactional memory implementation may also provide a "commit", or similar instruction, by which a thread may explicitly end, or commit, the most recently opened transaction. A programmer may insert such instructions explicitly or implicitly, in different embodiments. For example, a managed runtime environment such as Java™ Virtual Machines (JVMs) with just-in-time compilers (JITs) may transform existing synchronized blocks such that checkpoint and/or commit instructions may be executed before and after synchronized blocks, respectively. Alternatively, the programmer may insert such instructions manually.

In some embodiments, a transactional memory implementation may utilize the messages of a cache coherence protocol. For example, when a cache block invalidate message is sent to a processor, the processor may check to see if the invalidated cache block has been read by any active transactions. If it has, then the transactional memory protocol may dictate that any such transactions be aborted. Thus, transactional memory primitives may be used to detect and/or infer the passing of cache coherence messages.

In various embodiments, threads may utilize transactional memory to communicate with one another through cache coherence protocols in a manner that is more efficient than traditional communication using shared variables. For example, instead of using traditional spinning, a thread may spin on one or more variables in a manner that performs fewer bus operations by using transactional spinning. The traditional spinning example above may be implemented using transactional spinning, as in the following pseudo-code:

```
1:   checkpoint;
2:   if(A == 1) {
3:      while(true)
4:         { }
5:   }
6:   commit;
```

In the pseudo-code above, a transaction is started at line 1 using a checkpoint instruction. At line 2, the transaction reads the value of A and checks to see if it is equal to 1. If the value is not equal to 1, then the transaction is committed (at line 6) and execution continues beyond line 6. However, if the value of A equals 1, then the transaction enters an infinite loop, as shown in line 3, and spins indefinitely. At a subsequent time, a different thread T2 may modify the value of A, assigning to A a value not equal to 1. Consequently, an invalidate message may be received by T1, as per the cache coherence protocol. This message may be visible to the transactional memory system. In this example, because the value of A has been read inside the body of the transaction shown above, and the transaction has not yet been committed, the transaction may abort and execution may continue beyond line 6. In other embodiments, the checkpoint instruction may specify a location to which execution should jump in the case of an abort (e.g., a jump point).

If the program semantics dictate that memory location A is never overwritten by the same value already contained in it, and/or if the cache coherence protocol does not send an invalidate message when values in memory are overwritten with identical values, then the pseudo-code above serves a purpose semantically identical to traditional spinning. However, unlike in traditional spinning, the transactional spinning example above does not execute a second RTS bus operation, thereby increasing the performance and/or efficiency of the execution. Thus, in various embodiments, transactional memory constructs may be used to implement more efficient communication between threads via cache coherency messages.

Figure 3:
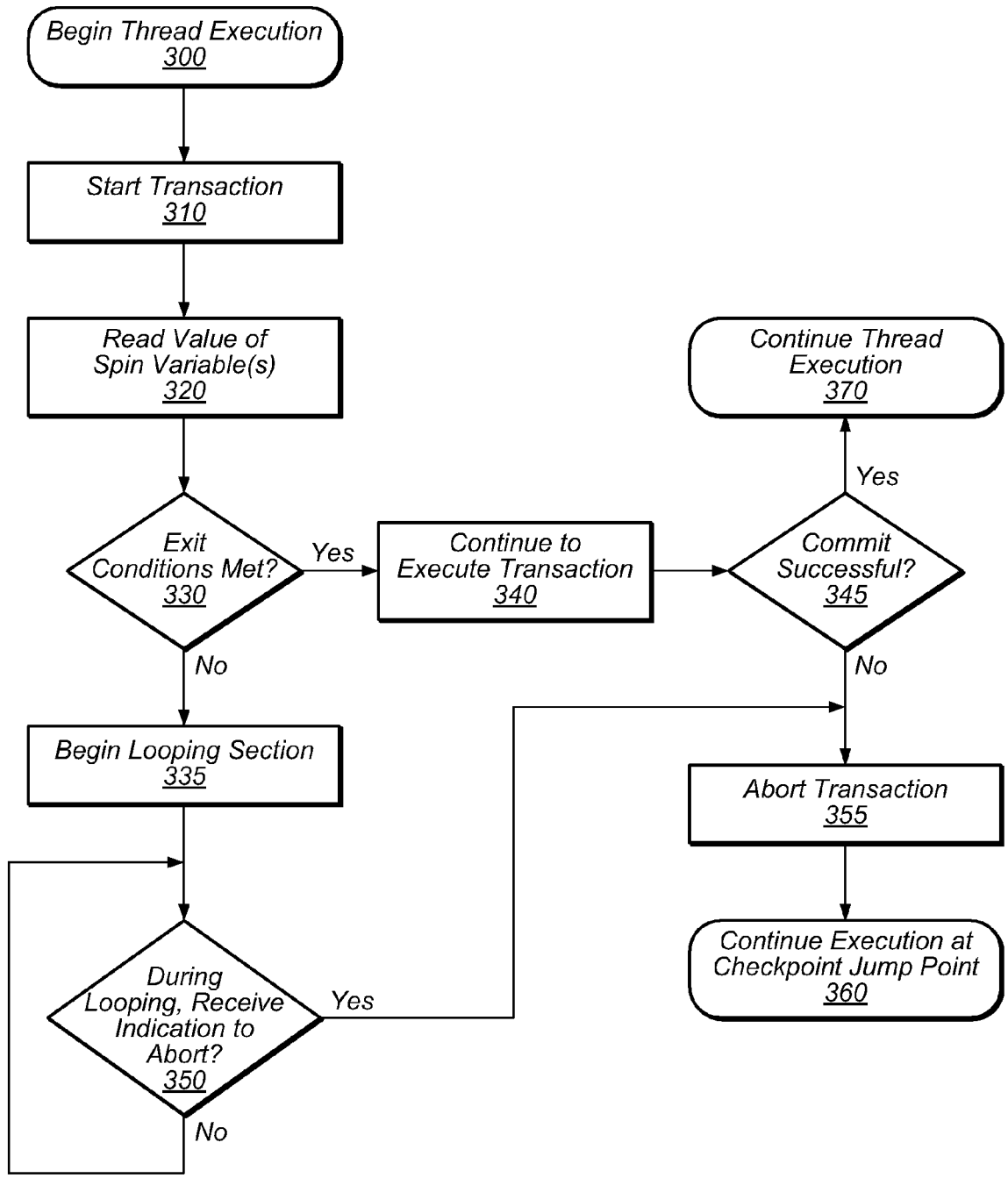
FIG. 3 is a flowchart illustrating a method for spinning on a variable using transactional memory, according to some embodiments.

FIG. 3 is a flowchart illustrating a method for transactional spinning, according to one embodiment. In this example, the thread executes normally as in 300 until the program logic calls for the thread to spin on one or more variables. At that point, the thread starts a transaction, as in 310. In some embodiments, beginning a transaction at 310 may be implemented using a checkpoint type instruction, as discussed above. The thread may read the value of a spin variable from memory, as in 320. In some embodiments, the thread may spin on multiple variables by reading the values of several variables at 320. Reading multiple variables inside of a transactional spin may result in an "or" relationship among the spin variables. For example, if, at 320, a thread reads the values of memory locations A, B, and C, then the exit conditions may be met if the value in any one of A, B, or C changes.

In step 330, the thread may determine if the spin termination conditions are already met. For example, if the spin variable is a lock, the thread may determine whether the value of the lock indicates that the lock is currently held by another thread. If the lock is not held by another thread, then the thread may no longer need to spin. Instead, it may execute the remainder of the transaction (as in 340) and attempt to commit the results (as in 345). In different embodiments, the remainder of the transaction may be empty or may contain any number of program instructions. If the commit is successful (designated by the affirmative exit from 345), then the thread may continue normal execution, as in 370. Otherwise, the transaction may abort, as shown by the negative exit from 345 to 355. If the transaction aborts, as in 355, then execution may continue at the checkpoint jump point, as in 360.

If the spin termination conditions are not met, as designated by the negative exit from 330, then the thread may execute some code, such as an infinite loop, as shown at 335. As used herein, the term "infinite loop" may refer to any code path that may be effectively relied upon to never commit the transaction and to abort only if any of the spin variables have been modified by a remote thread. One simple example, shown above, is a while loop that exits on a condition that cannot be satisfied, such as the Boolean value "false". Though the example above demonstrates the use of a while loop, in other embodiments, a for-loop or any other looping construct that may spin indefinitely may be used. Still other embodiments may employ iterative logic other than looping constructs. For example, instructions executed as part of 335 may invoke a function X, which may in turn invoke a function Y, which may invoke function X again. If neither function X nor function Y can commit the transaction, and if neither can abort due to factors other than a write to one of the spin variables, then an invocation of function X would cause an infinitely looping code path.

In some embodiments, effectively infinite code paths may be used rather than strictly infinite code paths. In some such embodiments, the exit conditions of the loop may be impossible to satisfy due to program semantics. For example, in Java, a for loop of the form "for(int i=0; i>0; i++)" may effectively act as an infinite loop. In other embodiments, the looping conditions may involve other variables not present in the loop controls or even in the transaction. In general, if the loop terminates when a given variable takes a value that program semantics dictate it cannot take during that point in the loop execution, then the loop is effectively infinite. Semantics outside of the program may render the loop infinite as well. For example, if the loop exit condition is that system time stamps produced 10 seconds apart are identical, the loop may be effectively infinite. Likewise, a loop with an execution time that is significantly longer than the spinning is likely to last may be considered effectively infinite. For example, a loop that spins for ten days is effectively infinite in many contexts. In another embodiment, a loop termination condition that is highly improbable may be used to produce an effectively infinite loop. For example, if the loop generates 1000 random numbers and only exits if they are all equal, then this may be an effectively infinite loop because the probability of exiting the loop may be negligible.

In various embodiments, the loop body may be empty, as in the code examples above. In other embodiments, the loop body may contain any number of instructions and/or function calls. The loop body may, in some embodiments, include other loops. In various embodiments, the loop body may include instructions executable to allow the executing thread to yield the processor to other threads. In this manner, the spinning thread may waste fewer processor cycles while waiting for communication.

In the example illustrated in FIG. 3, the only path out of the infinite loop of 335 may be an abort caused by a remote thread modifying at least one of the spin variables, as in 350. If such an abort occurs, as in the affirmative exit from 350, then at least one of the spin variables has been modified and the thread may abort, as in 355, and continue execution at a checkpoint jump point, as in 360.

In some embodiments, execution of the thread at 360 and 370 may continue from the same point, as in the pseudo-code example above. In other embodiments, such as the one illustrated in FIG. 3, execution paths from these two points may be distinct, but they may overlap. For example, if a thread uses transactional spinning to acquire a lock, continuing thread execution at 360 may include reattempting the transaction. In some embodiments, this may be achieved by specifying, in the checkpoint instruction at 310, a jump point to which execution passes in the case an abort. For example, the pseudo-code below illustrates an example of the use of transactional spinning for acquiring a lock:

```
1:  checkpoint(1)      // checkpoint instruction specifies jump point = 1
2:  if (lock != 0) while(true){ }
3:  lock = 1;
4:  commit;
```

In the pseudo-code example above, line 1 begins a transaction, as in 310, and specifies that, in the case of an abort, control should return to line 1, effectively causing the transaction to be retried. In line 2, the spin variable "lock" is read (as in 320) and the exit conditions are checked (as in 330). If the conditions are met (shown as the affirmative exit from 330), then the transaction body is attempted (as in 340) and the lock is acquired at line 3. At line 4, the transaction attempts to commit (as in 345). If the commit succeeds, then execution continues on line 5, as in 370. However, if the commit fails, then the transaction may abort (as in 355) and control may return to line 1, as specified in the checkpoint instruction.

On the other hand, if on line 2, the variable "lock" does not equal zero, then this may indicate that the lock is held and the exit conditions are therefore not met (shown as the negative exit from 330). In that case, the thread may spin in an infinite loop (as in 335). In this example, this is implemented by a simple while loop. The while loop on line 2 terminates only when another thread modifies the spin variable "lock". This modification of the value of lock may cause an abort of the transaction, as in the affirmative exit from 350 and in 355, and a jump back to line 1, as in 360. In this example, the transaction would be attempted again.

Figure 4:
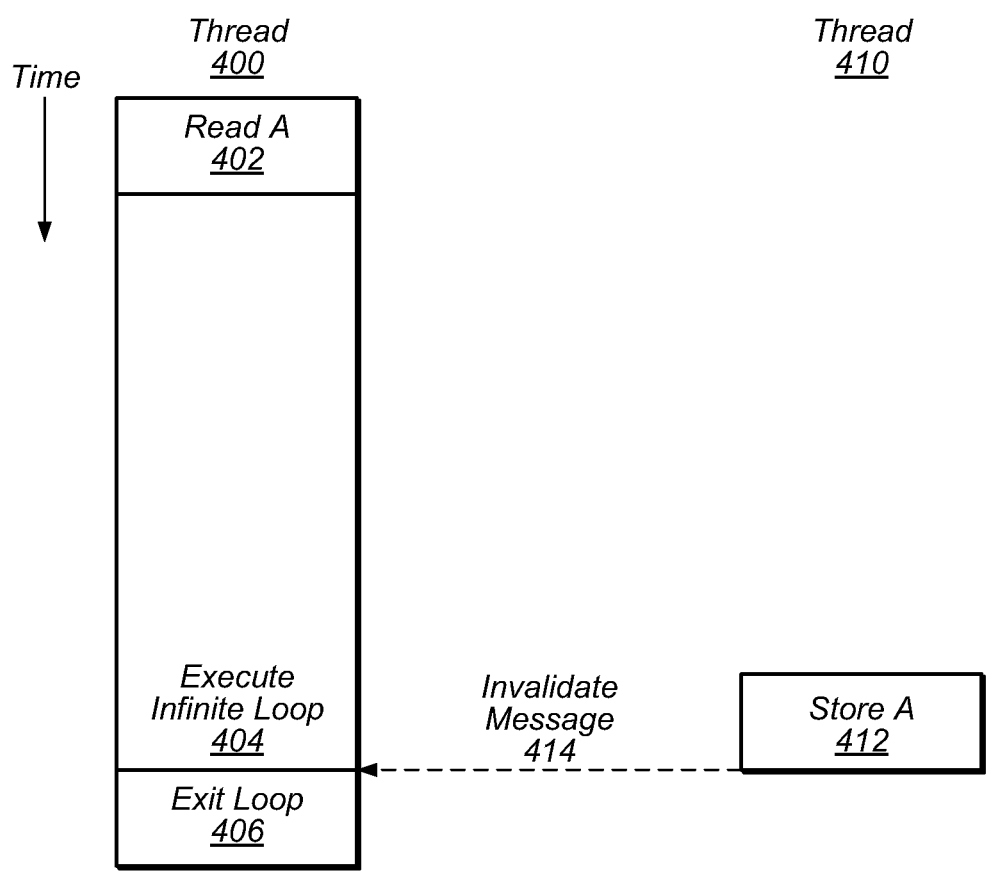
FIG. 4 illustrates communication between threads using cache coherency messages, according to some embodiments.

FIG. 4 illustrates an example of programmatic communication between threads using cache coherence messages, according to some embodiments. In the illustrated example, thread 400 reads the value of a shared memory location A, as in 402. Thread 400 then executes code comprising an infinite loop as in 404. Thus, thread 400 is spinning on A. Subsequent to the start of 404, another thread 410 modifies the value of A, as in 412. In the illustrated example, the modification of 412 causes a cache coherence invalidate message 414 to be sent from the processor executing thread 410 to the processor executing thread 400. Thread 400 may detect invalidate message 414 and exit the infinite loop, as in 406. In some embodiments, thread 400 may detect invalidate message 414 by using transactional memory as illustrated in FIG. 3. In other embodiments, various other methods may be used by thread 400 to detect invalidate message 414. For example, in some embodiments, one or more performance counters may be used to detect an invalidate message.

Figure 5:
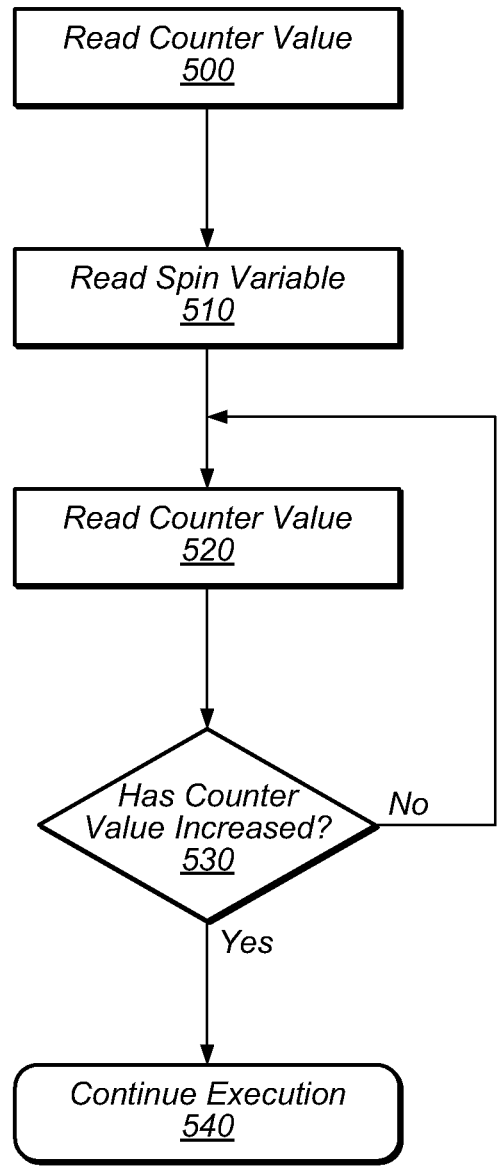
FIG. 5 is a flowchart illustrating a method by which a thread utilizes a performance counter to detect an invalidate message, according to one embodiment.

In various embodiments, a processor may include hardware mechanisms configured to increment one or more hardware performance counters each time the processor receives a given type of cache coherence message, such as an invalidate message. In such embodiments, a thread may utilize the one or more performance counters to detect a cache coherence message. FIG. 5 illustrates a method by which a thread may utilize a performance counter to detect an invalidate message, according to one embodiment. In this example, the thread may read the value of a performance counter that is configured to count the number of invalidate messages received by the processor, as in 500. The thread may then read a spin variable, as in 510, and enter a loop that iteratively checks the value of the performance counter. Such a loop may include an operation to read the value of the performance counter, as in 520. In this example, the thread may exit the loop only if the counter value has increased since it was read at 500. Once it is determined that the counter value has increased, shown as the affirmative exit from 530, the thread may continue execution, as in 540.

In the example illustrated in FIG. 5, as long as the counter value remains the same, shown as in the negative exit from 530, the loop may execute another iteration. This is shown as the feedback from 530 to 520. In this example, an increase in the counter value may indicate that an invalidate message has been received and that the spin variable has been modified. Note that in some such embodiments, it may be possible to experience false positives when using performance counters in this manner. For example, the receipt of an invalidate message relating to a memory location in the processor's cache other than that of the spin variable may in some embodiments also trigger an exit from the loop.

Figure 6:
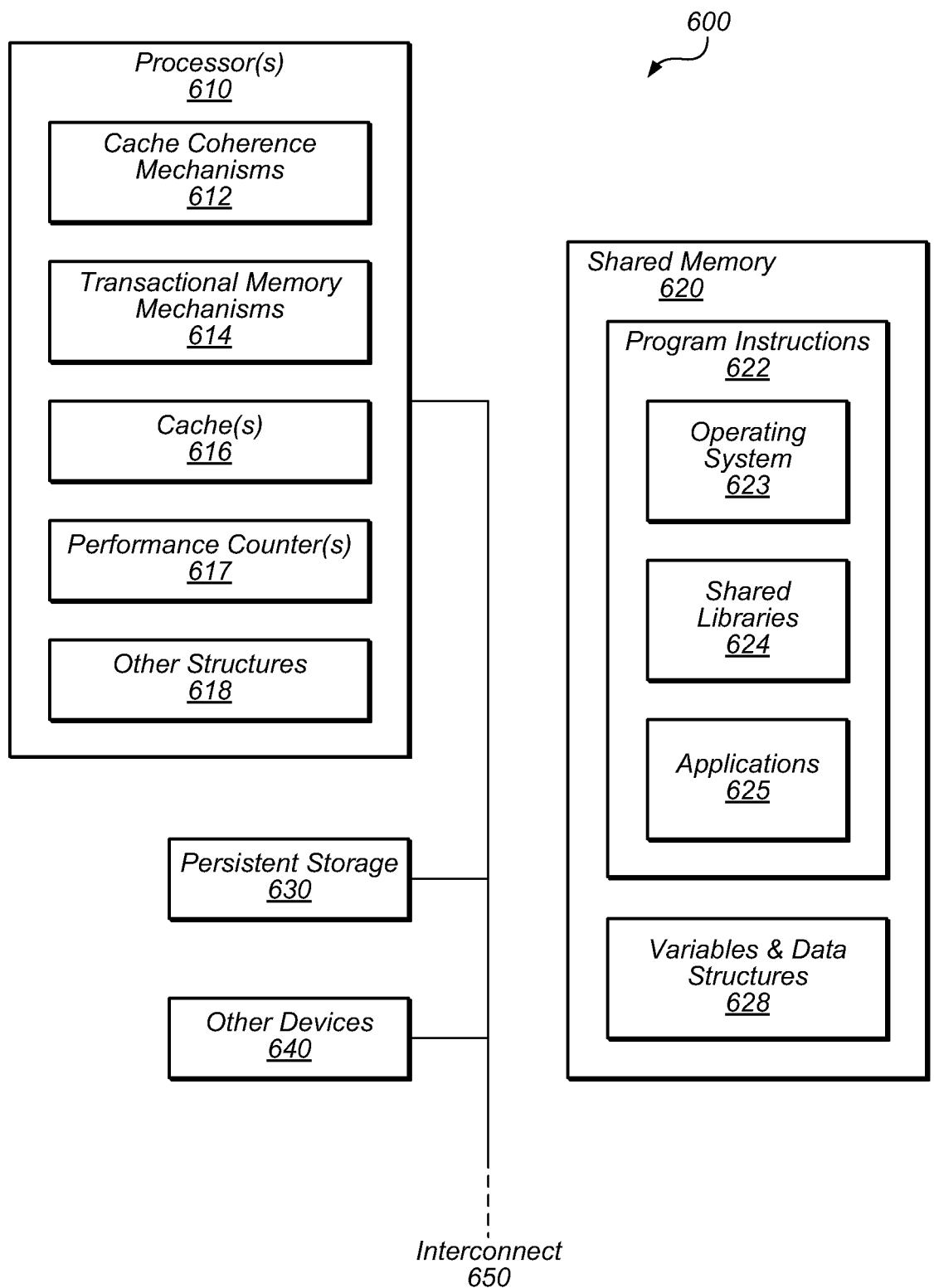
FIG. 6 is a block diagram of a computer system configured to implement programmatic, inter-thread communication using cache coherence messages, according to some embodiments.

FIG. 6 is a block diagram illustrating a computer system 600 configured to implement transactional spinning as described herein. The computer system may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In the illustrated embodiment, computer system 600 comprises one or more processors 610, each possibly containing multiple cores. Each processor may comprise more than one logical processor, for example, in systems supporting simultaneous multi-threading (SMT).

The computer system 600 may also include one or more persistent storage devices 630 (e.g., optical storage, magnetic storage, hard drive, tape drive, solid state memory, etc) and one or more system memories 620 (e.g., one or more of cache, SRAM, DRAM, RDRAM, EDO RAM, DDR RAM, SDRAM, Rambus RAM, EEPROM, etc.). In various embodiments, computer system 600 may also include fewer or additional components 640, such as video cards, audio cards, additional network interfaces, peripheral devices, a network interface such as an ATM interface, an Ethernet interface, a Frame Relay interface, or other devices.

The system components, including the processors 610, memories 620, persistent storage devices 630, and other devices 640, may be connected via one or more interconnects 650. Interconnect 650 may be implemented as any broadcast, point-to-point, or hybrid communication mechanism such as a front side bus, Ethernet, InfiniBand™, etc.

One or more of the shared memories 620 may contain program instructions 622, which may include one or more operating systems 623, shared libraries 624, and applications 625. Program instructions 622 may be encoded in platform native binary, any interpreted language such as Java™ bytecode, or in any other language such as C/C++, Java™, etc or any combination thereof. The shared memories 620 may further comprise memory locations 628 for storing shared variables and other data structures, such as variables on which a thread may spin.

The processors 610 may comprise any number of memory caches 616, which may be hierarchical in nature, as well as other structures 618 (e.g., a translation look-aside buffer). In some embodiments, each processor 610 may include one or more performance counters 617, which may be configured to detect cache coherence messages, as described herein. Performance counters 617 may in some embodiments be implemented as special-purpose registers.

Accessing values in shared memory 620 may be slower than accessing values in local caches 616. Therefore, hardware and/or software mechanisms may be included in system 600 for storing local copies of data accessed by recently executed program instructions 622, e.g., in one or more caches 616. The values of memory locations near recently referenced locations may also be stored in caches 616 using mechanisms such as hardware or software pre-fetching or multi-line pre-fetching.

In system 600, each processor may comprise one or more hardware cache coherence mechanisms 612. However, in various embodiments, cache coherence mechanisms may also be implemented in software, or in both hardware and software simultaneously. These mechanisms and protocols may insure coherence between caches, for example, according to the MESI protocol or MOESI protocols.

In various embodiments, system 600 may comprise transactional memory mechanisms 614 for implementing transactional memory in hardware. In various embodiments, transactional memory may be implemented in hardware, in software, or using a combination thereof. Transactional memory implementations may provide a "checkpoint", or similar instruction, and a "commit", or similar instruction, to explicitly indicate the beginning and end of a given transaction respectively, as described herein.

Although the embodiments above have been described in considerable detail, numerous variations and modifications will become apparent to those skilled in the art once the above disclosure is fully appreciated. For example, a thread may utilize mechanisms other than transactional memory to observe cache coherence messages. It is intended that the following claims be interpreted to embrace all such variations and modifications.

What is claimed:

1. A computer-implemented method, comprising:
executing a thread on a given processor;
reading, by the thread, a value from a shared memory location;
subsequent to said reading, beginning execution of a sequence of program instructions by the thread, wherein the sequence of program instructions comprises:
a programmatic loop that does not define a condition for exiting the loop;
wherein termination of the execution of the sequence is dependent on receipt of an indication that a value has been written to the shared memory location by another thread and is not dependent on the value written to the shared memory location;
during execution by the thread of the sequence of program instructions, writing, by a second thread executing on a second processor, a value in the shared memory location;
subsequent to said writing, receiving, by the given processor, an indication from the second processor that a value has been written to the shared memory location; and
in response to said receiving, terminating the execution of the sequence of instructions and performing a subsequent action dependent on the value of the shared memory location having changed.

2. The method of claim 1,
wherein said reading and said beginning execution are executed as part of a transaction in a transactional memory system; and
wherein said terminating is performed in response to an abort of the transaction.

3. The method of claim 2, further comprising:
in response to the abort of the transaction, the thread reattempting the transaction.

4. The method of claim 1,
wherein the indication comprises a value of a hardware performance counter configured to count cache coherence messages.

5. The method of claim 1, wherein the indication does not include an indication of the value written to the shared memory location.

6. The method of claim 1, wherein the indication is sent to the thread only if the value written to the shared memory location is different than the value read from the shared memory location.

7. The method of claim 6, wherein determining that the value written to the shared memory is different than the value read from the shared memory location is performed without reading the value written to the shared memory location from the shared memory location.

8. The method of claim 1, wherein the shared memory location represents a lock and the value of the shared memory location represents the value of the lock.

9. The method of claim 1, wherein the sequence of program instructions comprises instructions executable to implement the thread voluntarily yielding the given processor.

10. A system, comprising:
one or more processors; and
a memory coupled to the one or more processors and storing program instructions executable by the one or more processors to implement:
- a thread executing on one of the one or more processors;
- the thread reading a value from a shared memory location;
- subsequent to said reading, the thread beginning execution of a sequence of program instructions, wherein the sequence of program instructions comprises:
  - a programmatic loop that does not define a condition for exiting the loop;
- wherein termination of the execution of the sequence is dependent on receipt of an indication that a value has been written to the shared memory location by another thread and is not dependent on the value written to the shared memory location;
- during execution by the thread of the sequence of program instructions, a second thread writing a value in the shared memory location;
- subsequent to said writing, the one of the one or more processors receiving an indication that a value has been written to the shared memory location by another thread; and
- in response to said receiving, the thread terminating the execution of the sequence of instructions and performing a subsequent action dependent on the value of the shared memory location having changed.

11. The system of claim 10, further comprising a transactional memory implementation;
wherein said reading and said beginning execution are executed as part of a transaction in the transactional memory implementation; and
wherein said terminating is performed in response to an abort of the transaction.

12. The system of claim 11, wherein the program instructions are further executable to implement:
in response to the abort of the transaction, the thread reattempting the transaction.

13. The system of claim 10, wherein the indication is sent to the thread only if the value written to the shared memory location is different than the value read from the shared memory location.

14. A non-transitory, computer readable storage medium storing program instructions executable by a processor to implement:
- a thread executing on the processor;
- the thread reading a value from a shared memory location;
- subsequent to said reading, the thread beginning execution of a sequence of program instructions, wherein the sequence of program instructions comprises:
  - a programmatic loop that does not define a condition for exiting the loop;
- wherein termination of the execution of the sequence is dependent on receipt of an indication that a value has been written to the shared memory location by another thread and is not dependent on the value written to the shared memory location;
- during execution by the thread of the sequence of program instructions, the processor receiving an indication that a value has been written to the shared memory location by another thread; and
- in response to said receiving, the thread terminating the execution of the sequence of instructions and performing a subsequent action dependent on the value of the shared memory location having changed.

15. The storage medium of claim 14,
wherein said reading and said beginning execution are executed as part of a transaction in a transactional memory implementation; and
wherein said terminating is performed in response to an abort of the transaction.

16. The storage medium of claim 14, wherein the indication is sent to the thread only if the value written to the shared memory location is different than the value read from the shared memory location.

* * * * *

UNITED STATES PATENT AND TRADEMARK OFFICE
CERTIFICATE OF CORRECTION

PATENT NO.        : 9,021,502 B2
APPLICATION NO.   : 12/345179
DATED             : April 28, 2015
INVENTOR(S)       : Dice et al.

Page 1 of 1

It is certified that error appears in the above-identified patent and that said Letters Patent is hereby corrected as shown below:

In the specification
Column 1, line 31, delete "TI" and insert -- T1 --, therefor.

Signed and Sealed this
Ninth Day of February, 2016

Michelle K. Lee
*Director of the United States Patent and Trademark Office*